United States Patent

[11] 3,557,834

| [72] | Inventors | Erwin H. Hartel<br>Brunswick;<br>Louis C. Hrusch, Chesterland, Ohio |
|---|---|---|
| [21] | Appl. No. | 761,240 |
| [22] | Filed | Sept. 20, 1968 |
| [45] | Patented | Jan. 26, 1971 |
| [73] | Assignee | The Cleveland Pneumatic Tool Company<br>Cleveland, Ohio<br>a corporation of Ohio |

[54] ROTATION DAMPER AND ACTUATOR
14 Claims, 6 Drawing Figs.

[52] U.S. Cl. .................................................. 137/625.31,
137/78, 137/460; 251/58, 251/48, 251/73; 74/89,
92/31
[51] Int. Cl. ................................................ F16k 17/32,
F16k 17/04, F16k 31/16

[50] Field of Search .......................................... 251/58;
74/89, 2; 92/31; 251/73, 48; 137/78, 460

[56] References Cited
UNITED STATES PATENTS

| 766,410 | 8/1904 | Alger | 92/31X |
|---|---|---|---|
| 1,572,068 | 2/1926 | Gould | 92/31X |
| 2,942,580 | 6/1960 | Siravo | 92/31 |

*Primary Examiner*—Arnold Rosenthal
*Attorney*—Stephen M. Mihaly

ABSTRACT: A rotation damper and actuator including piston connected both to a stationary housing and rotor housing by toggle linkages thus to effect rotation of the rotor housing during axial and rotary movements of the piston.

INVENTORS
ERWIN H. HARTEL
LOUIS C. HRUSCH

BY Stephen M. Mihaly

ATTORNEYS

INVENTORS
ERWIN H. HARTEL
LOUIS C. HRUSCH

BY Stephen M. Mihaly
ATTORNEYS 3,557,834

1

ROTATION DAMPER AND ACTUATOR

BACKGROUND OF THE INVENTION

The present invention relates generally as indicated to a rotation damper and actuator, especially designed for high speed closing of a rotatable porting ring such as used in safety ventilation valves of the type disclosed in the U.S. Pat. application of Erwin H. Hartel, Ser. No. 761,104, for "Safety Ventilation Valve," filed even date herewith.

The safety ventilation valve disclosed in such aforementioned application includes an actuator which permits fast closing of the rotatable porting ring by release of a torsion bar in response to a high shock wave load to close off an air conditioning duct or the like leading to an underground structure in the event of an atomic or nuclear explosion. The torsion bar is connected to the actuator rod through a retaining lever which converts rotary motion into axial motion. As a consequence, an undesirable moment force is applied to the outer end of the actuator rod by the torsion bar tending to force the actuator rod against the side of the actuator cylinder, which is relieved by mounting the entire actuator for limited pivotal movement.

Summary of the Invention

With the foregoing in mind, it is a principal object of this invention to provide a rotation damper and actuator in which the torsion bar acts directly on the axis of the actuator, thereby eliminating any moment forces applied by the torsion bar against the actuator.

A further object is to provide such a rotation damper and actuator in which rotary motion of the torsion bar is accommodated by axial and rotary motion of the piston, thereby enabling the actuator housing to be rigidly mounted.

Another object is to provide such a rotation damper and actuator in which the actuator piston may be cocked in a novel manner to apply a torsion load to the torsion bar and retained in the cocked condition until released by a shock wave or other applied force.

Yet another object is to provide a rotation damper and actuator of the type described which is of a relatively simple and inexpensive construction.

A further object is to provide such a rotation damper and actuator which is relatively compact and easy to install.

These and other objects of the present invention may be achieved as by providing the rotation damper and actuator with a piston suitably connected to a stationary housing and rotor housing by toggle linkages thus to permit rotation of the rotor housing and torsion bar centrally connected thereto during axial and rotary movements of the piston.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

2

Figure 5:
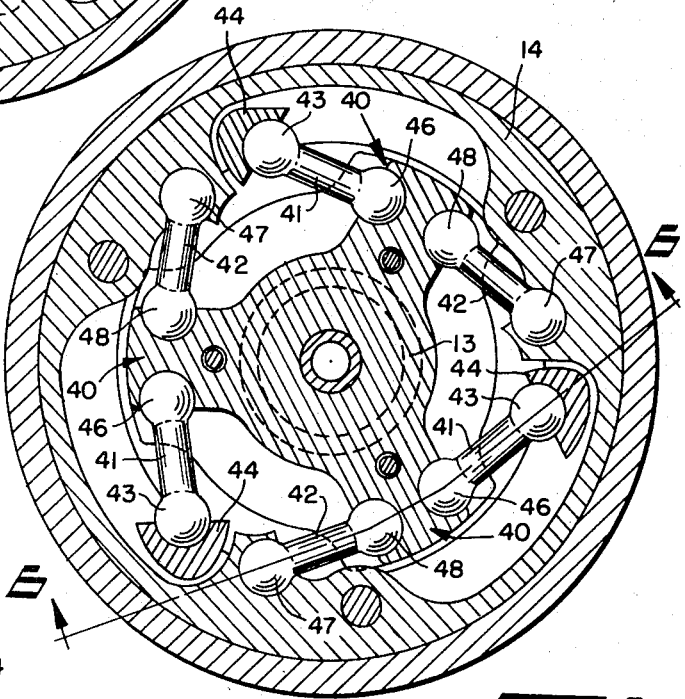
Figure 6:
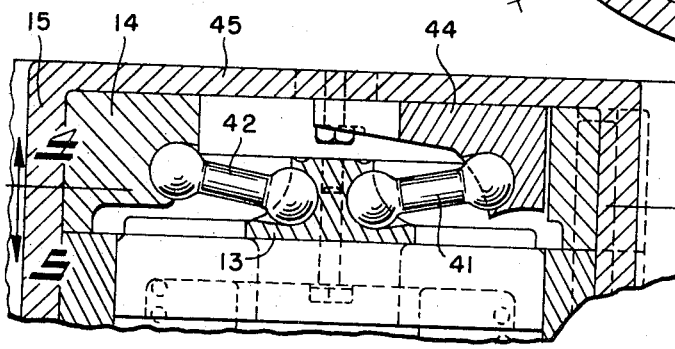

FIG. 6 is a fragmentary longitudinal section through one pair of toggle links shown in FIG. 5, taken on the plane of the line 6—6 thereof.

DESCRIPTION OF THE PREFERRED EMBODIMENT

Figure 1:
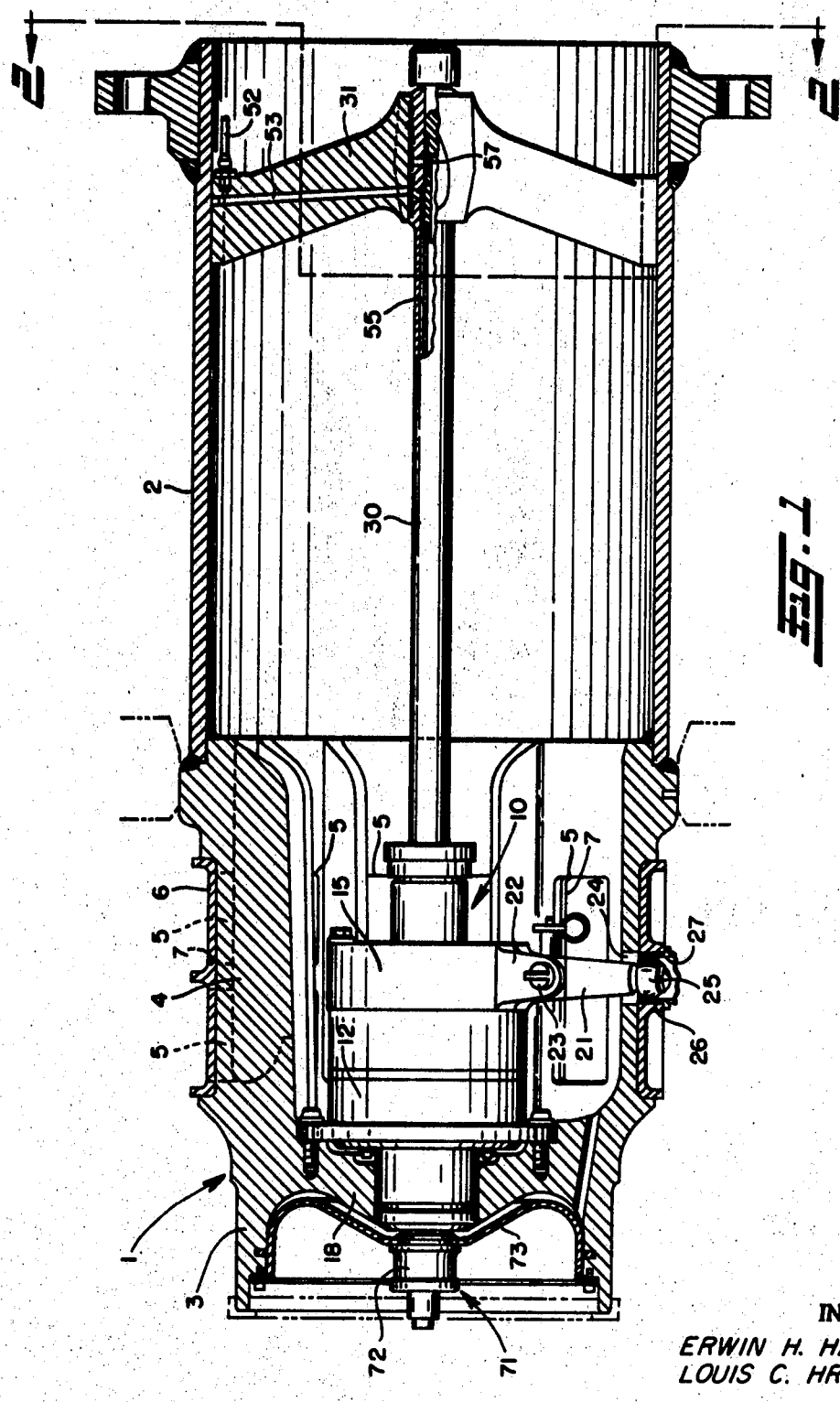
FIG. 1 is a longitudinal section through a preferred form of rotation damper and actuator in accordance with this invention.
Figure 2:
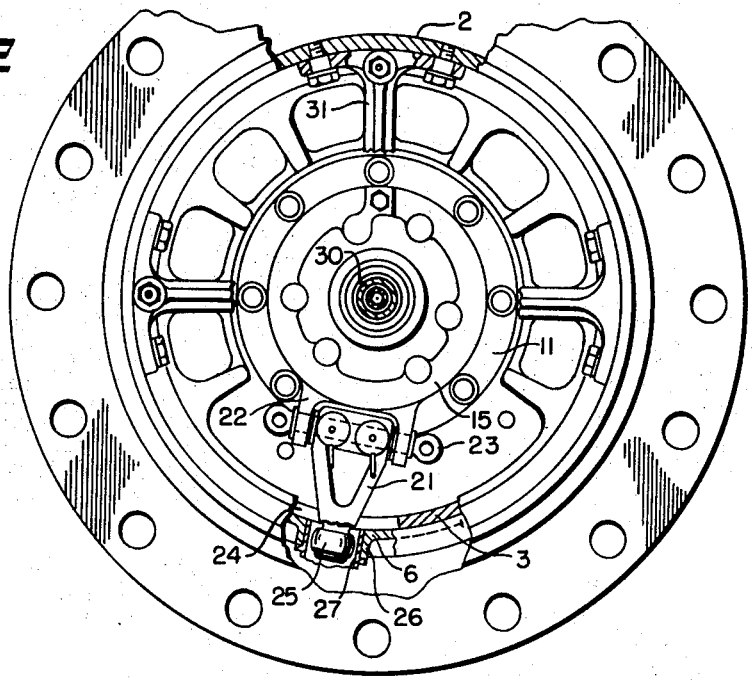
FIG. 2 is a fragmentary transverse section through the actuator of FIG. 1, taken on the plane of the line 2—2 thereof, portions of which are broken away to show the manner of connection of the rotor housing to the porting ring and the end mounting for the torsion bar.

In FIG. 1 there is illustrated by way of example a safety ventilation valve 1 of the type generally shown and described in the aforementioned pending application to Erwin H. Hartel, Ser. No. 761,104, filed even date herewith, including a main tubular valve housing 2 to which is welded a bulkhead 3 having a cylindrical valve housing 4 with one or more rows of ports 5 therein adapted to be opened or closed by rotation of a valve or porting ring 6 disposed thereabout having machined ports 7 that match the ports 5 in the valve housing 4. However, in place of the fluid actuator 16 of such aforementioned application for rotating the porting ring, there is provided a rotation damper and actuator 10 having a stationary housing portion 11 bolted or otherwise suitably secured to the end wall 18 of the bulkhead 3.

For a more clear understanding of the details of construction and operation of the rotation damper and actuator 10 of the present invention, reference may be had to FIGS. 2 through 6. As shown, the stationary housing part 11 contains a cylinder 12 in which a piston 13 is axially slidably received. The outer end of the cylinder 12 desirably extends outwardly beyond the stationary housing part 11 and has a stationary ring 14 bolted thereto which is surrounded by a rotor housing 15 mounted for rotation about the cylinder 12 by suitable bearings 16. A removable stop ring 17 secured to the rotor housing 15 between the adjacent ends of the stationary housing part 11 and bearings 16 precludes axial movement of the rotor housing 15 relative to the cylinder 12, and suitable packings 20 preclude fluid leakage therebetween.

A drive lever 21 (see especially FIGS. 1 and 2) interconnects the rotor housing 15 with the porting ring 6, one end of such drive lever 21 being pivotally connected to a yoke 22 on the rotor housing 15 by a pin 23, and the other end extending through a circumferential slot 24 in the bulkhead 3 and having a ball bearing 25 thereon which is received in a lug 26 on the porting ring 6 lined by a sleeve 27. Rotation of the porting ring 6 to the closed position is achieved by the spring force of a torsion bar 30. As seen in FIG. 1, one end of the torsion bar 30 is fixed to the main tubular valve housing 2 against rotation as by means of a weblike support member 31 suitably fastened to both parts. The other end of the torsion bar 30 is received in a bore 32 in the reduced central end portion 33 of the rotor housing 15 and splined thereto for rotation together (see FIG. 3).

Figure 4:
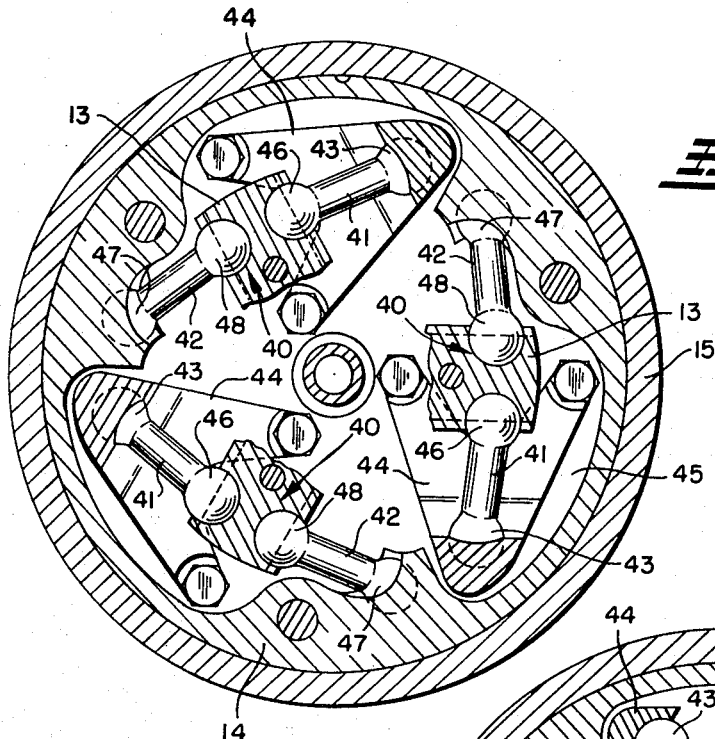
FIGS. 4 and 5 are enlarged transverse sections through the actuator of FIG. 3, taken on the planes of the lines 4—4 and 5—5, respectively.

A torsion load is applied to the torsion bar 30 by actuation of the piston 13 which is connected to the stationary ring 14 and rotor housing 15 by plural sets 40 of toggle linkages, which are best seen in FIGS. 4 — 6. Although the number of sets of toggle linkages may be varied depending upon the size of the actuator and space available, it is preferred that three such sets 40 be provided, with two toggle linkages 41 and 42 in each set. One toggle linkage 41 of each set has one end 43 attached to brackets 44 bolted to the end wall 45 of the rotor housing 15 and the other end 46 attached to the piston 13, whereas the other toggle linkage 42 of each set has one end 47 attached to the stationary ring 14 and the other end 48 attached to the piston 13. In each instance, the toggle linkages 41 and 42 are desirably relatively short and have a spherical ball at each end to facilitate attachment through a suitable fitting to the appropriate actuator parts as just described to provide universal joint connections therebetween.

With the piston 13 thus connected to the stationary ring 14 and rotor housing 15, axial movement of the piston 13 will cause rotation of the rotor housing 15 as the angle between the face of the piston and the toggle linkages 41,42 changes. Such angle both before and after rotation is determined by the coefficient of friction expected, it being of course understood that the angle cannot be 0° or 90° or otherwise there would be no component of the toggle linkage load tangential to the axis of rotation of the rotor housing, which is necessary to accomplish the desired movements.

Figure 3:
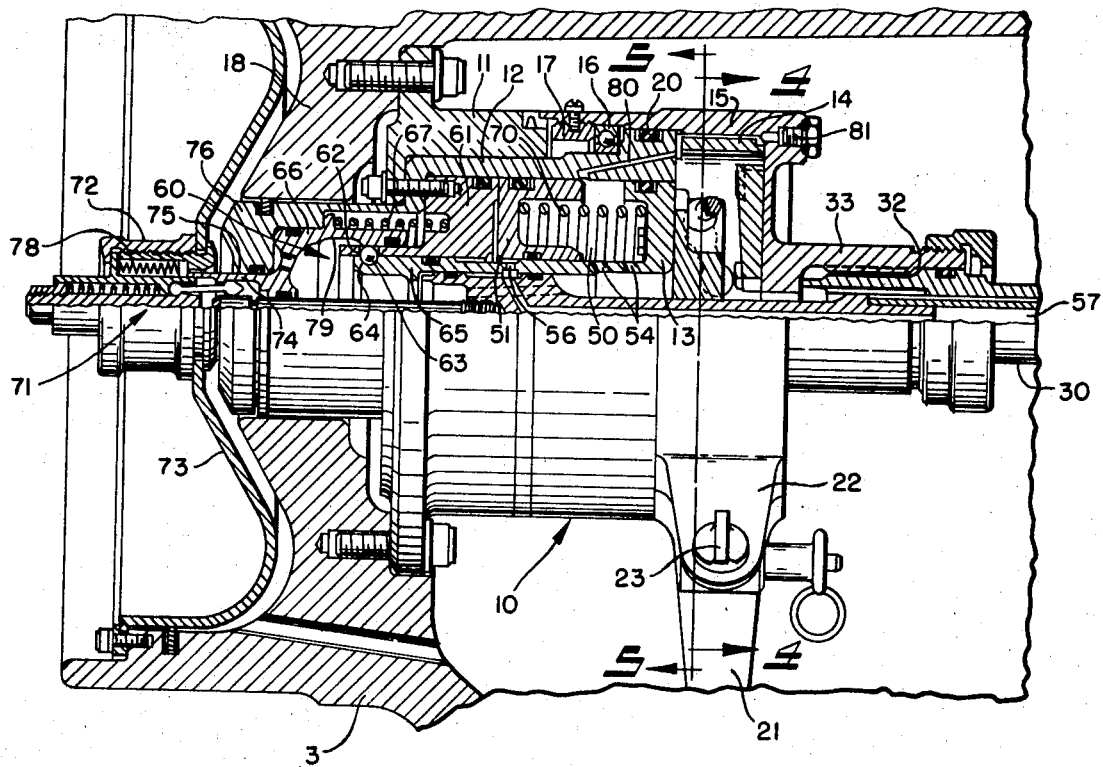
FIG. 3 is an enlarged fragmentary longitudinal section through a portion of the rotation damper and actuator of FIG. 1.

Axial movement of the piston 13 toward the right as viewed in FIG. 3 to effect rotation of the rotor housing 15 through the toggle linkages and thus apply a torsion load to the torsion bar 30 may be accomplished either by pressurizing the damping chamber 50 immediately behind the piston 13 or by pressurizing a secondary piston 51 contained in the cylinder 12 which will in turn move the main piston 13. Fluid pressure may be supplied to the damping chamber 50 from an underground installation (not shown) through a conduit 52 (see FIGS. 1 and 3) suitably coupled to a passageway 53 in the support member 31 which communicates with pressure ports 54 in the main piston 13 through an annular passageway 55 in the torsion bar 30. An additional pressure port 56 may be provided in the piston 13 adjacent the bottom of the cylinder 12 for supplying pressure to actuate the secondary piston 51, such additional pressure port 56 communicating with a central bore 57 in the torsion bar 30 to which another fluid pressure conduit may be suitably connected.

When the piston 13 reaches the end of its outward stroke, it is releasably locked in place by a locking mechanism 60 which generally consists of a retaining sleeve 61 fixedly mounted in the stationary housing 11 and having a plurality of circumferentially spaced openings 62 therein containing balls 63 adapted to engage an annular groove 64 in the piston sleeve 65 when brought into axial alignment therewith. With the balls 63 in the annular groove 64, a lock sleeve 66 surrounding the retainer sleeve 61 is free to be moved by a spring 67 into a position overlying the retaining sleeve openings 62 to preclude a radial outward movement of the balls 63 as shown in FIG. 3. Now, fluid pressure may be cut off to the pressure ports 54 or 56 and the piston 13 will still be retained in the extended position by the lock mechanism 60 holding the torsion bar under load. With such loss of pressure, the secondary piston 51 is returned to its original position against the retaining sleeve 61 by the spring 70 to allow the main piston 13 to stroke through its damping cycle in a manner to be subsequently explained.

Associated with the locking mechanism 60 is a lock release mechanism 71 comprising a plug 72 mounted in the center of a flexible blasthead 73 adjacent the end wall 18 of the bulkhead. The plug 72 is hollow for receipt of an extension 74 of the lock sleeve 66 which projects through a central opening 75 in the cylinder end wall 76. Whenever the pressure acting on the blasthead 73 due to shock waves and the like accelerates the blasthead toward the bulkhead 3, its motion is transmitted to the lock sleeve 66 through the spring 78 to compress the lock spring 67, thus bringing the undercut 79 of the lock sleeve 66 into alignment with the balls 63 so that they may be forced outwardly out of engagement with the annular groove 64. Now the piston 13 is free to move inwardly and accordingly the spring tension of the torsion bar 30 will accelerate the valve ring 6 to the valve closing position. The end movement of the piston 13 is dampened by controlling the rate of flow from the damping chamber 50 through an orifice 80 in the cylinder wall, the size of which may be adjusted by adjusting the position of a flow control valve 81. The resulting pressure acts on the piston 13 tending to resist its stroke thus to decelerate the movement of the porting ring 6 in a controlled manner.

From the above discussion, it can now be seen that the rotation damper and actuator of the present invention permits fast closing of the rotatable porting ring without incurring undesirable torque on the actuator piston due to the action of the torsion bar thereon, and loading of the torsion bar may also be accomplished without incurring any undesirable torsion loads on the various parts of the actuator.

We claim:

1. In combination, a valve adapted for insertion in a vent duct and the like, and an actuator for controlling the movements of said valve, said valve comprising an annular valve housing having a plurality of circumferentially spaced ports therein and a valve ring associated with said valve housing having a plurality of annularly spaced ports therein matching the ports in said valve housing, and said actuator comprising a stationary housing part rigidly mounted in said valve housing, a cylinder contained in said stationary housing part, a piston in said cylinder, a rotor housing surrounding one end of said cylinder, means mounting said rotor housing for rotation about said cylinder, means interconnecting said rotor housing with said valve ring for rotation thereby, link means interconnecting said piston with said one end of said cylinder and said rotor housing for rotation of said rotor housing during axial movement of said piston, and means for rotating said rotor housing.

2. The combination of claim 1 wherein rotation of said rotor housing is effected by pressure actuation of said piston.

3. The combination of claim 1 wherein rotation of said rotor housing is effected by a torsion bar having one end rigidly mounted within said valve housing and the other end centrally connected to said rotor housing, and means are provided for releasably retaining said piston against axial movement thus to preclude rotation of said rotor housing by said torsion bar except upon release of said piston.

4. The combination of claim 3 further comprising means for dampening the end movement of said piston upon releasing the same to decelerate the movement of said rotary valve ring in a controlled manner.

5. The combination of claim 1 wherein there are plural pairs of link means, one link means of each pair having one end attached to said rotor housing and the other end attached to said piston, and the other link means of each pair having one end attached to said one end of said cylinder and the other end attached to said piston.

6. The combination of claim 5 wherein said one end of said cylinder is formed by attachment of a stationary ring to said cylinder.

7. An actuator for use in controlling the movements of a rotary member comprising a cylinder, a piston in said cylinder, a rotor housing surrounding one end of said cylinder, means mounting said rotor housing for rotation about said cylinder, means for connecting said rotor housing to said rotary member for rotation thereby, first link means having ball joint connections at opposite ends with said piston and said one end of said cylinder, and second link means having ball joint connections at opposite ends with said piston and said rotor housing for effecting rotation of said rotor housing during axial movement of said piston, and means for rotating said rotor housing.

8. The actuator of claim 7 wherein rotation of said rotor housing is effected by pressure actuation of said cylinder.

9. The actuator of claim 8 comprising a secondary piston in said cylinder which when pressurized causes axial movement of said first-mentioned piston.

10. The actuator of claim 7 wherein there are plural pairs of said first and second link means, said first link means of each pair having one end attached to said rotor housing and the other end attached to said piston, and said second link means of each pair having one end attached to said one end of said cylinder and the other end attached to said piston.

11. The actuator of claim 7 wherein said one end of said cylinder is formed by attachment of a stationary ring to said cylinder.

12. An actuator for use in controlling the movements of a rotary member comprising a cylinder, a piston in said cylinder, a rotor housing surrounding one end of said cylinder, means mounting said rotor housing for rotation about said cylinder, means for connecting said rotor housing to said rotary member for rotation thereby, link means interconnecting said piston with said one end of said cylinder and said rotor housing for rotation of said rotor housing during axial movement of said piston, and means for rotating said rotor housing comprising a torsion bar operatively connected to said rotor housing, and means for releasably retaining said piston against axial movement thus to preclude rotation of said rotor housing by said torsion bar except upon release of said piston.

13. The actuator of claim 12 wherein said means for releasably retaining said piston against axial movement comprises a retaining sleeve fixedly mounted with respect to said cylinder, said retaining sleeve having a plurality of circumferentially spaced openings therein containing balls, said piston having a sleeve with an annular groove which receives said balls when brought into axial alignment therewith, and a lock sleeve surrounding said retainer sleeve and movable into and out of position overlying said retainer sleeve openings to respectively preclude and permit radial outward movement of said balls.

14. The actuator of claim 12 further comprising means for dampening the end movement of said piston upon releasing the same.